EDWIN C. CLEVELAND AND JOSEPH M. BASSETT, OF WORCESTER, MASSACHUSETTS.

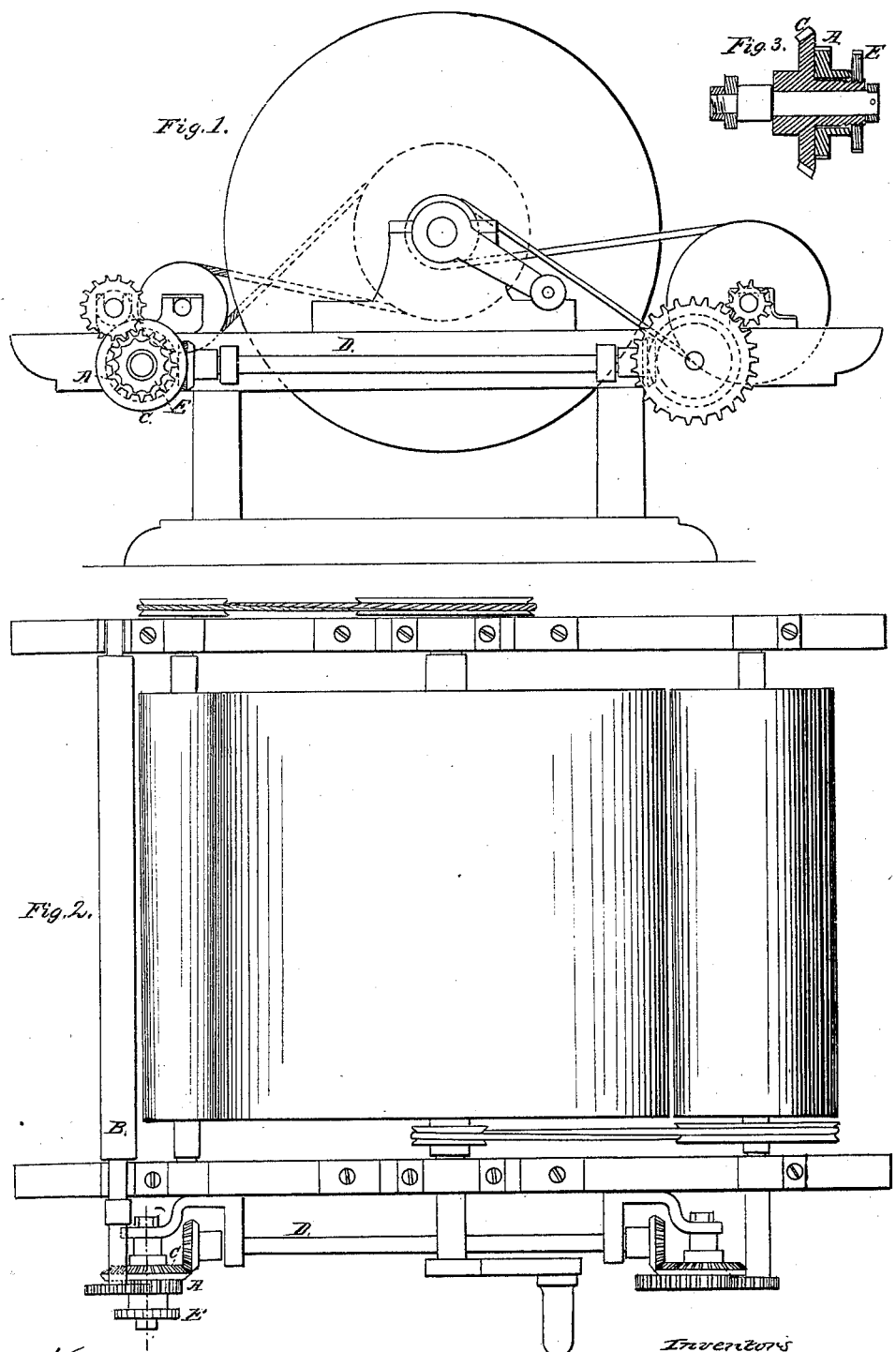

Letters Patent No. 86,211, dated January 26, 1869.

IMPROVEMENT IN CARDING-ENGINE.

The Schedule referred to in these Letters Patent and making part of the same.

*To all whom it may concern:*

Be it known that we, EDWIN C. CLEVELAND and JOSEPH M. BASSETT, of Worcester, in the county of Worcester, and State of Massachusetts, have invente[d] new and useful Improvements in Carding-Machines; and we do hereby declare that the following is a full, clear, and exact description thereof, which will enable those skilled in the art to make and use the same, reference being had to the accompanying drawings, forming part of this specification.

This invention relates to improvements in carding-machines, whereby it is designed to provide a more improved means for setting the feed-rollers into or out of action.

In the accompanying drawings—

Figure 1 represents a side elevation of a carding-machine provided with our improved arrangement;

Figure 2 represents a plan view of the same; and

Figure 3 represents a detail view.

Similar letters of reference indicate corresponding parts.

It is frequently necessary, for various reasons, to disconnect the feed-rollers from the driving-mechanism, and this is commonly done by sliding the bearings of the driving-shaft out of line, which is an objectionable practice, as it cramps in the bearings, and produces bad effects on the same and on the journals of the shafts.

Instead of this arrangement, we prefer to arrange the wheel A, which communicates rotary motion to the driving-roller through a cog-wheel thereon, and which derives motion from the bevel-wheel C, gearing into a corresponding wheel on the driving-shaft D, so that it will work loosely on the hub of the said wheel C, when not clamped thereto by the jam-nut E, screwing on to the outer end of the hub of the wheel c, which projects through the hub of the wheel A.

By this simple arrangement, which we find to be of cheaper construction than the ordinary arrangement for sliding the shaft D so as to throw the wheel thereon out of contact with the wheel C, we are enabled to effect the stoppage of the feed-rollers more readily (also the setting of them in motion) than by the said arrangement, as it requires only the turning of the jam-nut a slight distance, either in one direction or the other, for engaging the wheel A in frictional contact with the wheel C, or disengaging it therefrom.

When it is disengaged, the hub of the wheel C will turn freely in the bore of the wheel A, which will be prevented from rotation by the resistance of the rollers.

We claim as new, and desire to secure by Letters Patent—

The combination of the wheel A and jam-nut E with the bevel-gear C, having a screw-threaded hub, and with the feed-rollers and driving-mechanism of a carding-engine, substantially as and for the purpose set forth.

EDWIN C. CLEVELAND.
JOSEPH M. BASSETT.

Witnesses:
W. W. RICE,
JOS. BURROUGH.